(12) United States Patent
Huang

(10) Patent No.: US 8,002,136 B2
(45) Date of Patent: Aug. 23, 2011

(54) EXPLOSION-PROOF MATERIAL AND ITS PROCESSING METHOD

(75) Inventor: Xiaodong Huang, Beijing (CN)

(73) Assignee: Shanghai Huapeng Explosion-Proof Science and Technology Co., Ltd., Shanghai (CN)

(*) Notice: Subject to any disclaimer, the term of this patent is extended or adjusted under 35 U.S.C. 154(b) by 238 days.

(21) Appl. No.: 12/280,342

(22) PCT Filed: Jul. 31, 2007

(86) PCT No.: PCT/CN2007/002299
§ 371 (c)(1),
(2), (4) Date: Oct. 28, 2008

(87) PCT Pub. No.: WO2009/015514
PCT Pub. Date: Feb. 5, 2009

(65) Prior Publication Data
US 2010/0233502 A1    Sep. 16, 2010

(51) Int. Cl.
*B65D 90/22* (2006.01)
(52) U.S. Cl. .......................... 220/88.1; 428/98; 428/906
(58) Field of Classification Search .................. 428/906, 428/98; 220/88.1
See application file for complete search history.

(56) References Cited

U.S. PATENT DOCUMENTS
4,925,053 A * 5/1990 Fenton et al. ................ 220/88.1

FOREIGN PATENT DOCUMENTS
DE     20023859 U    1/2007
WO    2004/091728    10/2004

* cited by examiner

*Primary Examiner* — Alexander Thomas
(74) *Attorney, Agent, or Firm* — Fliesler Meyer LLP

(57) ABSTRACT

The present invention provides an explosion-proof material which includes a high-porosity sheet (11); With one side(12) of the material as center, the high-porosity sheet (11) is wound into multilayer material body(1) along the direction perpendicular to the side(12); The skeleton(13) is inserted between the multilayer high-porosity sheet (11) of the material body(1); The present invention also provides a processing method for explosion-proof material, including: inserting the skeleton (13) between the high-porosity sheet (11), cutting off the high-porosity sheet (11), and the high-porosity sheet in which the skeleton(13) is inserted is wound into multilayer explosion-proof material. The present invention adopts skeleton to support the body of high-porosity sheet, and thus can effectively prevent the material body from collapse and deformation. Featured by simple structure and easiness of processing, the present invention can effectively prevent explosion accident, thus achieving the safety, environment friendness and reliability of storage-transport vessel.

12 Claims, 11 Drawing Sheets

EXPLOSION-PROOF MATERIAL AND ITS PROCESSING METHOD

FIELD OF THE INVENTION

The present invention relates to an explosion-proof material that may be safely used in the storage-transport vessel for flammable or explosive dangerous chemicals as well as its processing method, and especially relates to a technology-separate and explosion-proof material and its processing method.

DESCRIPTION OF THE PRIOR ART

In the storage-transport vessel of flammable and/or explosive dangerous chemicals in liquid state or gaseous state, in order to prevent the media combustion and/or explosion accident caused by unexpected events such as static, naked flame or gunshot, a reticular explosion-proof material is filled in such storage-transport vessel. As for the existing reticular explosion-proof materials, one form is a cylinder-shaped object, which is formed from rolled reticular explosion-proof material, and then the roll is filled in the storage-transport vessel one by one. The technical characteristics of this kind of explosion-proof material have been disclosed in the patent document of invention with patent number of ZL 92102437. This kind of curly material is immersed in the medium of vessel for long term. The mutual stacking and pressing between materials result in the deformation and collapse of materials. The material at the lower part of the vessel has to carry great load, which has strong impact on the explosion-proof performance of reticular material and even deprives the explosion-proof ability of such materials. In such case, combustion and explosion may be easily initiated. Another form of the reticular explosion-proof materials is an unit which is formed from filling and fixing the reticular explosion-proof materials in the framework fabricated in advance, and then the different shapes of units are filled in the storage-transport vessel. The technical characteristics of this kind of explosion-proof materials have been disclosed in the patent document of a utility model with patent number of ZL 200520017386. In order to adopt the units of explosion-proof materials with this structure, it is necessary to fabricate the framework in a long processing cycle using complex processes. Furthermore, such framework takes up the effective volume of the storage-transport vessel, thus having disadvantageous influence on the effect of filling materials.

Most of the existing explosion-proof materials are made of metallic materials. Due to the swarming (namely the so-called phenomena "surge") of the liquid medium in storage-transport vessel during the transportation process, the stresses applied on such materials are irregular and the stresses on various parts of such materials are uneven. Over a long term it is easily to generate scraps, which may affect the separate and explosion-proof performances of the material and may even have certain influence on the properties of oil product. Meanwhile, most of existing explosion-proof materials are made of integral metallic materials, which result in the defect of high manufacturing cost and expenses. Furthermore, once anyone of existing explosion-proof materials made of metallic materials has been stereotyped, it is very difficult to compress the volume of such material in any degree, thus bringing out inconvenience to its storage and transportation to some extent.

SUMMARY OF THE INVENTION

The first object of the present invention is to provide an explosion-proof material, aiming at overcoming the deficiency of prior art. A skeleton is added in the gap between layers of multilayer high-porosity sheet material so as to enhance the strength of material and effectively prevent the material from collapse and deformation.

The second object of the present invention is to provide an explosion-proof material aiming at overcoming the deficiency of prior art. Featured by simple structure, this explosion-proof material achieves the safety, reliability and environmental-friendness of storage-transport vessel.

The third object of the present invention is to provide an explosion-proof material aiming at overcoming the deficiency of prior art. With low manufacturing cost, this explosion-proof material can effectively prevent metallic scraps.

The fourth object of the present invention is to provide an explosion-proof material aiming at overcoming the deficiency of prior art. The non-metal material part of this explosion-proof material may be compressed, so that it is feasible to save space during the transportation, thus bringing about great convenience for storage and transportation.

The fifth object of the present invention is to provide a processing method for the explosion-proof material aiming at overcoming the deficiency of prior art. Featured by simple process steps, short processing cycle and high production efficiency, this processing method may be easily achieved.

The objects of present invention are achieved through the following technical solutions. An explosion-proof material is composed of a high-porosity sheet. With one side of it as center, this high-porosity sheet is wound into multilayer material body along the direction being perpendicular to this side; A skeleton is inserted in the gap between any two layers of this multilayer high-porosity sheet, so that the material body has adequate strength and elasticity.

According to different requirements, said skeleton may be designed in different structure forms. This skeleton may be formed by interweaving the carriage and the stiffening ring. The stiffening rings are inserted in the middle part of the carriage and fixed on it, with the shape of the skeleton corresponding to the shape of the material body. The carriage may be an undulated or rectangle framework. To guarantee that the skeleton has preferable supporting and fixing actions on the explosion-proof material, the skeleton shall be made from elastic materials. In addition, the skeleton may also be made from metallic material or non-metal material or composite material or materials obtained through metallic/non-metallic coating technology or their combination. According to different requirements for the strength in the process of use, the skeleton may be designed as continuous skeleton or discontinuous skeleton. The position(s) for inserting the skeleton may be selected as the gap between any two layers of this multilayer high-porosity sheet of the material body or selected as multiple places.

In addition, for the convenience in processing, the skeleton may also be composed of columns and beams. The columns are inserted between multiple high-porosity sheet with high void of the material body and projected on the upper and lower end surfaces of the material body. The beams and the columns shall be connected together.

What is more, the skeleton may also be composed of more than one framework. These frameworks are set up between multilayer high-porosity sheet of the material body, and multiple frameworks are mutually connected at their top and bottom.

In addition to this, the skeleton may also be composed of two parts, the upper skeleton and the lower skeleton. These upper skeleton and lower skeletons respectively include mutually connected end frames and insertion frames. Said end frames are respectively put over upper and lower end surfaces of the material body, and said insertion frames are inserted to the gap between multilayer high-porosity sheet of the material body, so that the material body has adequate strength and elasticity.

According to different requirements for filling positions, the material body may be in the shape of cuboid or cube or polygonal column.

At the same time, the high-porosity sheet is a metallic material or alloy material or materials obtained through metallic/non-metallic coating technology or their combination.

The present invention provides an explosion-proof material. This explosion-proof material contains a core-body and a metal mesh wrapping the core-body. The core-body is made of an expandable forming material. A coating layer is provided on the outside of the metal mesh. The winding mode for metal mesh is integral winding or partial winding.

The present invention also provides an explosion-proof material. This explosion-proof material includes a core-body and an expandable forming material coated on the core-body. This core-body is made from metal mesh.

Said expandable forming material is polyether, poly-acid ester or polyurethane.

The present invention also provides a processing method for an explosion-proof material, which includes the following steps:

Step 1: Through cutting, a grid form semi-finished material is formed from the original curly open-width foil material;

Step 2: Gradually expanding and stretching both sides of the grid form semi-finished material, a high-porosity sheet is obtained;

Step 3: With one side of this high-porosity sheet as the center, winding the material along the direction being perpendicular to this side;

Step 4: During the process of winding inserting the skeleton into the gap between any two layers of the high-porosity sheet; winding the material continually until it forms a circular cylinder with required diameter; cutting off the high-porosity sheet, and thus forming the explosion-proof material.

The procedures for inserting the skeleton in said step 4 include:

Step 4.1: Conduct pre-opening treatment on the skeleton formed by interweaving the undulated carriage and stiffening rings or rectangular carriage and stiffening rings;

Step 4.2: Insert the pre-opened skeleton into the high-porosity sheet. This skeleton is inserted in one position or multiple positions in a continuous or spiral or discontinuous manner.

The procedures for inserting the skeleton in multiple positions in step 4.2 include: The skeleton formed by interweaving undulated carriage with stiffening rings is inserted in multiple positions, or the skeleton formed by interweaving a rectangular carriage with stiffening rings is inserted in multiple positions, or said two kinds of skeletons are inserted in multiple positions in a combined manner.

The procedures for inserting the skeleton in said step 4 include:

Step 4.1': In the process of winding said high-porosity sheet, string the columns on multiple positions on the material body, so that the columns project on the upper and lower end surfaces of the material body;

Step 4.2': Connect the parts of columns projecting on the upper and lower end surfaces of the material body using the beam, so as to form properly inserted skeleton.

The procedures for inserting the skeleton in said step 4 include:

Step 4.1": In the process of winding said high-porosity sheet, set up multiple frameworks in the gap between any two layers of the multilayer high-porosity sheet of the material body, with these frameworks being separated with each other at certain angle interval.

Step 4.2": Connect multiple frameworks with each other at their top and bottom, so as to form properly inserted skeleton.

The certain angle in said step 4.1" is 45°-90°.

The procedures for inserting the skeleton in said step 4 include:

Step 4.1'": In the process of winding the high-porosity sheet, insert the upper and lower skeletons composed of mutually connected end frames and insertion frames. The end frames are respectively put over on upper and lower end surfaces of the material body, and the insertion frames are inserted to the gap between any two layers of multilayer high-porosity sheet of the material body, so that the material body has adequate strength and elasticity.

The present invention also provides a processing method for an explosion-proof material, which includes the following steps:

Step 1: Through cutting, a grid form semi-finished material is formed from the curly open-width original foil material;

Step 2: Gradually expanding and stretching outward both sides of the grid form semi-finished material, so as to obtain a high-porosity sheet;

Step 3: With one side of this high-porosity sheet as the center, winding the material along the direction being perpendicular to this side;

Step 4: After winding to the specified extent, cutting off the material, inserting the skeleton in the gap between the rolled circular cylinder material layers, so as to form multilayer explosion-proof material.

A processing method for explosion-proof material, including the following steps:

Step (1): Through reticulation processing, the expandable forming material is made into honeycomb core-body;

Step (2): Enwinding a metal mesh on the outside surface of honeycomb core to form an explosion-proof material.

A processing method for explosion-proof material, wherein the method includes the following steps:

Step (1'): Through reticulation processing, the expandable forming material is made into honeycomb core-body;

Step (2'): Enwinding a metal mesh on the outside surface of honeycomb core-body;

Step (3'): Putting the material processed in said step (2') into die, and wrapping up its outside surface with expandable foaming material, so as to form coating layer; After shape forming, it becomes an explosion-proof material.

A processing method for explosion-proof material, wherein the method includes the following steps:

Step (1"): Through winding or superposition, making the metal mesh into a core-body;

Step (2"): Wrapping up the outside surface of the core-body with expandable foaming material; After shape forming, it becomes an explosion-proof material.

The processing method for metal mesh: Through cutting, a grid form semi-finished material is formed from the curly open-width foil material; Then, gradually expanding and stretching outward both sides of this grid-form semi-finished material into honeycomb reticular shape, thus forming a high-porosity sheet.

The processing method for said metal mesh may also be as follows: Mutually bonding the upper and lower surfaces of two adjacent metallic raw material into multilayer, with the bonding points being set up at equal distance interval in the transverse and longitudinal directions; cutting the properly bonded multilayer metallic raw material into strips in the same direction, expanding the multilayer material along the direction being perpendicular to the cutting direction; The interval positions between bonding points are expanded to form voids, so that high-porosity sheet is obtained.

In conclusion, the present invention has the following favorable effects. The present invention adopts skeleton to support the body of high-porosity sheet, and thus can effectively prevent the material body from collapse and deformation. At the same time, metallic material and non-metal materials are used in combination. In the process of transportation, it is compressible and thus can provide convenience for storage and transportation and save space. In addition, featured by simple structure and easiness of processing, the present invention can effectively prevent explosion accident initiated by naked flame, static electricity, welding, collision and faulty operation, thus achieving the safety, environment friendness and reliability of storage-transport vessel.

Further detailed descriptions of the technical proposals of present invention will be given as follows in combination with attached drawings and specific embodiments.

DETAILED DESCRIPTION OF THE PREFERRED EMBODIMENTS

Embodiment 1

Figure 1:
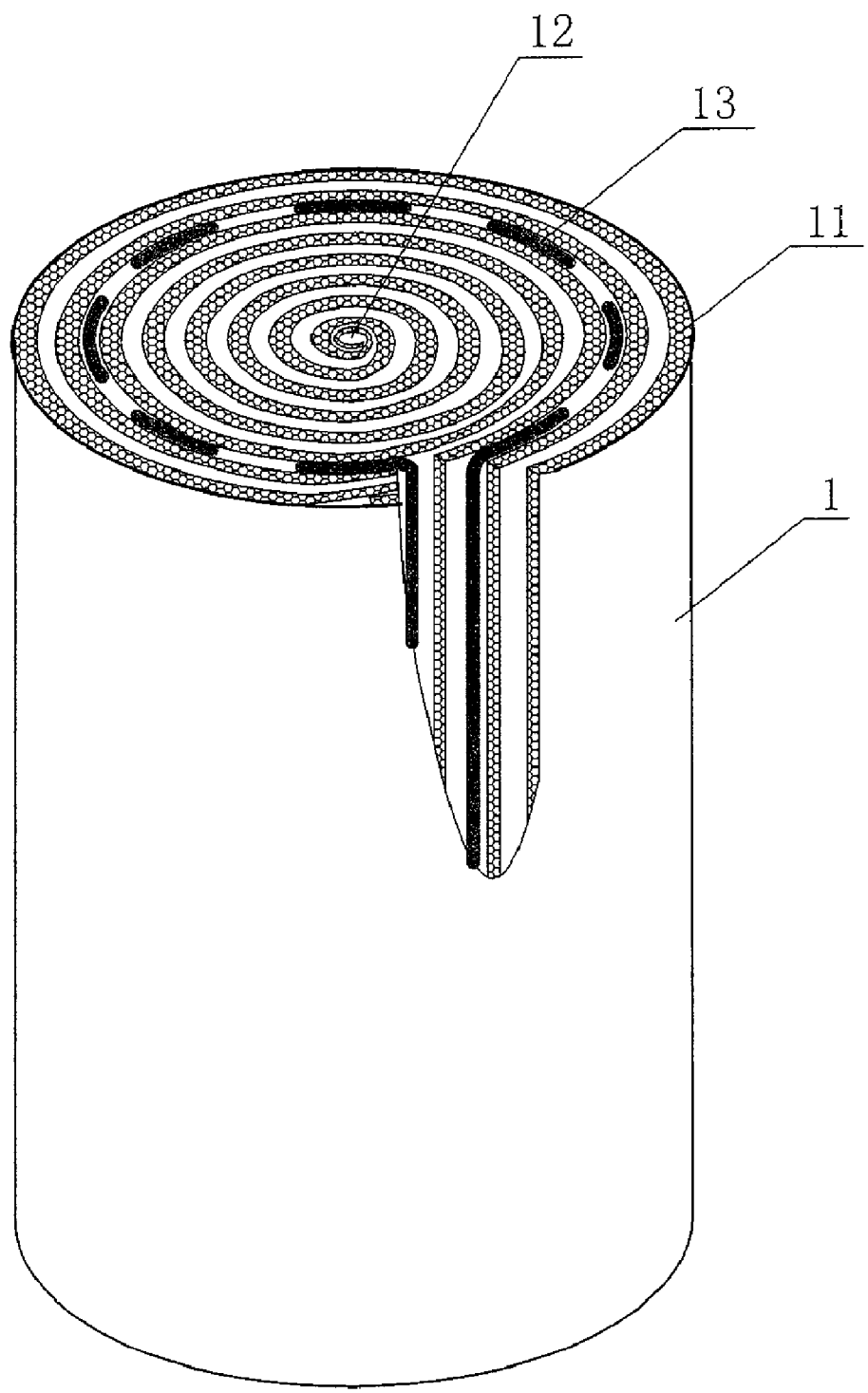
FIG. 1 is the overall structural representation of embodiment 1 of present invention.

FIG. 1 is the overall structural representation of embodiment 1 of present invention; As shown in FIG. 1, the present invention provides an explosion-proof material composed of a high-porosity sheet 11; With one side 12 of material as center, the high-porosity sheet 11 is wrapped into multilayer material body 1 along the direction being perpendicular to this side; A skeleton 13 is inserted in the gap at any two layers of multilayer high-porosity sheet 11 of the material body 1, so as to enable the material body 1 having adequate strength and elasticity.

Figure 2:
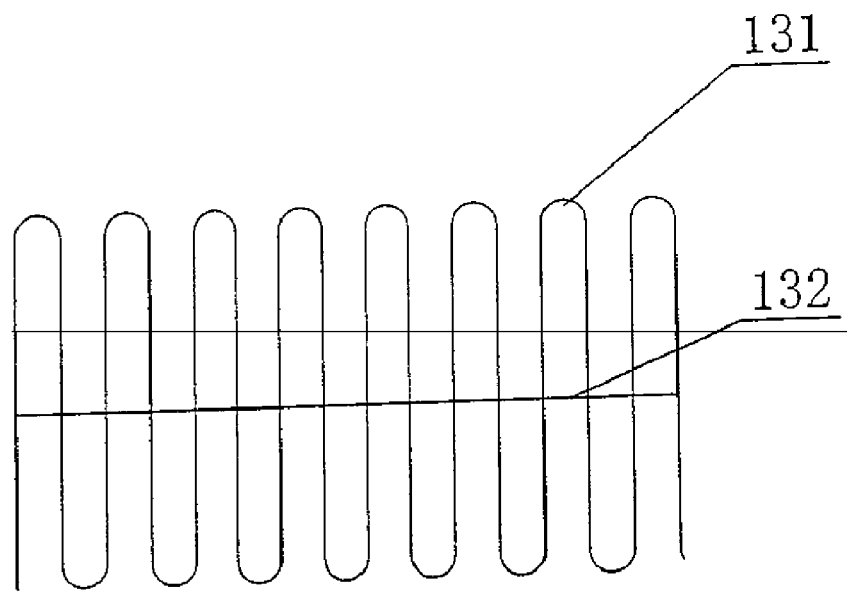
FIG. 2 is the expanded structural representation of the elastic skeleton of embodiment 1 of present invention.
Figure 3:
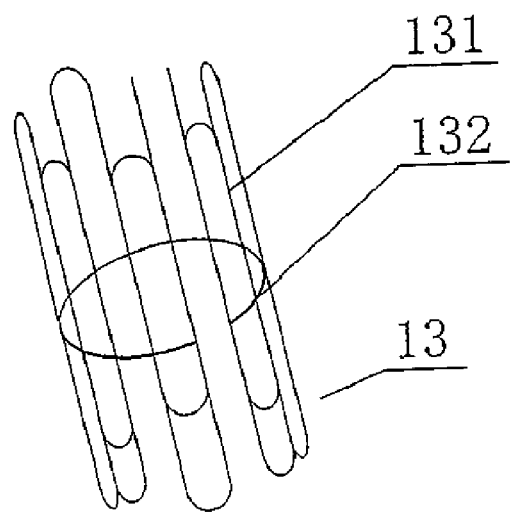
FIG. 3 is the overall structural representation of the elastic skeleton of embodiment 1 of present invention.

FIGS. 2 and 3 are the expanded structural representation, and the overall structural representation of the elastic skeleton of embodiment 1 of present invention. As shown in FIGS. 2 and 3, in order to provide effective support on the material body, the skeleton 13 may be an elastic skeleton formed by interweaving the carriage 131 with the stiffening ring 132. The stiffening ring 132 is stringed in the middle of carriage 131 and fixed on it. As shown in FIGS. 2 and 3, the carriage 131 in this embodiment is in undulate structure, which enables the carriage 131 to have adequate strength and elasticity. As shown in FIG. 3, the elastic skeleton may be designed as continuous skeleton or discontinuous skeleton. With reference to FIG. 1, in order to achieve preferable effect in practical application, it is also feasible to set up one or more of skeletons 13 between two flaky gaps of multiple high-porosity sheet 11 of the material body 1, so as to strengthen the effect of support.

In this embodiment, the processing procedure for the skeleton 13 is as follows: Through processing, bending a stick of spring steel into undulated shape and thus form into the carriage 131. In the middle of the carriage, fixing a stiffening ring 132 made of elastic material and thus form an undulate mesh piece. Then, crimple this undulate mesh piece into circular cylinder and thus form undulate elastic skeleton 13. The circular cylinder formed by this skeleton 13 has a diameter of φ50-300 mm and side length of 30-50 mm. As shown in FIGS. 2 and 3, two outside sides of carriage 131 are straight sides, and the space between them is 2.0-5.0 mm generally. As a general rule, spring steel in diameter Φ2.0-5.0 mm is selected to process and fabricate the carriage 131.

The processing procedures for the explosion-proof material provided in this embodiment mainly include: Firstly, by cutting the curly open width aluminum alloy foil material, forming grid-form semi-finished material; Then, gradually expanding and stretching outward both sides of this grid-form semi-finished material, and thus forming the high-porosity sheet 11; Then, with one side 12 of this high-porosity sheet 11 as center, winding this material into cylindrical form along the direction being perpendicular to this side. In the process of winding, inserting the skeleton 13 in the high-porosity sheet 11, and then continually winding the drawn reticular sheet material to certain extent, cutting off the material, and a new type explosion-proof material is formed.

In this embodiment, the procedure for inserting the skeleton 13 is as follows: Conducting pre-open treatment on the skeleton 13 formed by interweaving the undulate carriage 131 with the stiffening ring 132 as shown in FIG. 3, then inserting the open skeleton 13 into the high-porosity sheet 11.

This structure form of present invention, in which the skeleton 13 supports the multilayer high-porosity sheet of material body 1, can effective prevent the material body 1 from collapse and deformation; Meanwhile, featured by simple structure and easiness of processing, this material body 1 can effectively prevent explosion accident initiated by naked flame, static electricity, welding, gunshot, collision and faulty operation, thus achieving the safety, environment friendness and reliability of storage-transport vessel. This explosion-proof material can suppress the volatilization of oil gas and thus effectively reduce oil loss and pollution of atmospheric environment caused by oil gas. According to statistics, after implementing technological transformation for explosion proof and protection, a medium-scale gas station with annual sales of 5000 ton can reduce oil loss nearly 13 ton and save cost of more than 70,000 RMB.

The explosion-proof material of present invention is formed in the following procedures: Firstly, using the lancing mechanism of screen tension machine, conducting lancing on the aluminum alloy foil to form semi-finished product; After reshaping of semi-finished product, expanding and stretching the semi-finished product with the screen tension machine, and thus forming an aluminum foil high-porosity sheet; Then, conducting upending, coiling and lamination on the mesh piece with high void, and finally forming the new type explosion-proof material. The technical characteristics of the cutting screen tension machine used for processing this special aluminum foil have been disclosed in the patent of invention with patent number ZL02117070.3. Generally, the reticular material has thickness of 0.02-0.2 mm and width of 50-800 mm. The technical characteristics of the explosion-proof material in the shape of circular cylinder, which is formed after upending, coiling and lamination, have been disclosed in the patent of invention with patent number ZL92102437.1. The material has a diameter of φ100-300 mm. After upending and coiling, the grids between each layer of reticular material are interlacing and superimposing in the same direction. Through mutual superposition among multilayer grids a disorderly interlacing honeycomb pore structure is formed.

During the process of coiling said reticular material, undulate skeleton 13 is adopted when it is necessary to insert the skeleton 13. Inserting the skeleton 13 from the side of reticular material along two straight lines of its gap, the skeleton 13 can be fitted over the circular cylinder of the coiled material. Then the skeleton 13 is rotated with the reticular material so that the processed reticular material winds and overlays on the skeleton 13, until a roll of required explosion-proof material is made.

Embodiment 2

Figure 4:
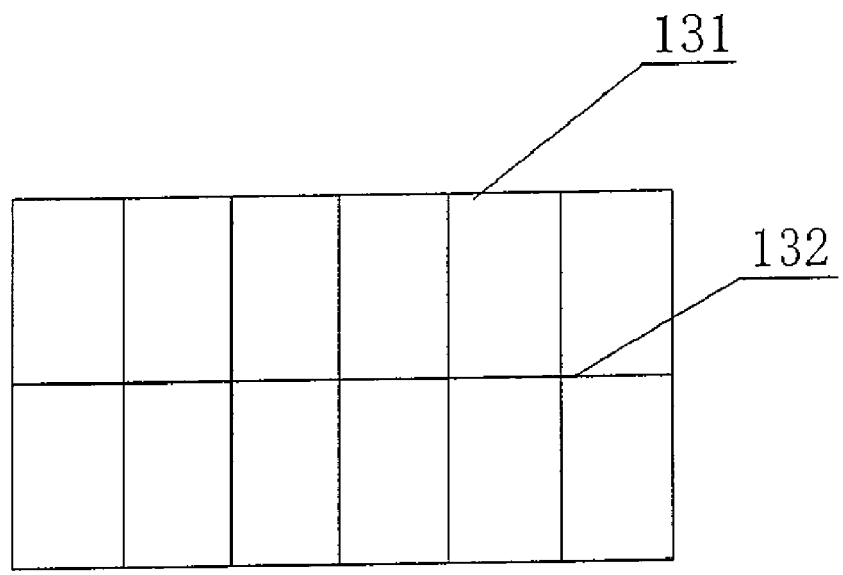
FIG. 4 is the expanded structural representation of the elastic skeleton of embodiment 2 of present invention.
Figure 5:
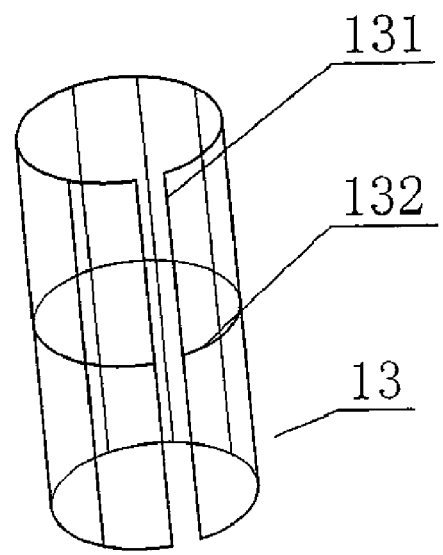
FIG. 5 is the overall structural representation of the elastic skeleton of embodiment 2 of present invention.

In practical applications, the carriage may be designed in multiple structure forms according to different requirements. As shown in FIG. 4 and FIG. 5, in this embodiment, the carriage 131 is in rectangle framework structure, and the stiffening ring 132 is stringed in the middle of the carriage 131. The carriage 131 and the stiffening ring 132 are interweaved and fixed, thus forming the skeleton 13. As shown in FIGS. 4 and 5, in this embodiment, the skeleton 13 is formed according to the following procedure: Through processing, a stick of spring steel is bent into rectangular carriage 131; in the middle of the carriage 131, fixing a stiffening ring 132 made from elastic material and thus forming a rectangle frame piece; Then, crimpling this rectangle frame piece into a circular cylinder, thus forming a rectangular elastic skeleton 13. The other technical characteristics in this embodiment are identical to those of embodiment 1, and unnecessary details will not be given herein.

It is necessary to note that, according to different requirements for the volume and shape of various vessels, the material body 1 may be made into multiple shapes. In addition to the circular cylinder in above embodiment, it is also feasible to adopt other shapes such as cuboid, cube and polygonal column. When a different shape is adopted for the material body 1, the shape of the skeleton 13 should be changed according to the shape of material body 1 accordingly.

Embodiment 3

Figure 6:
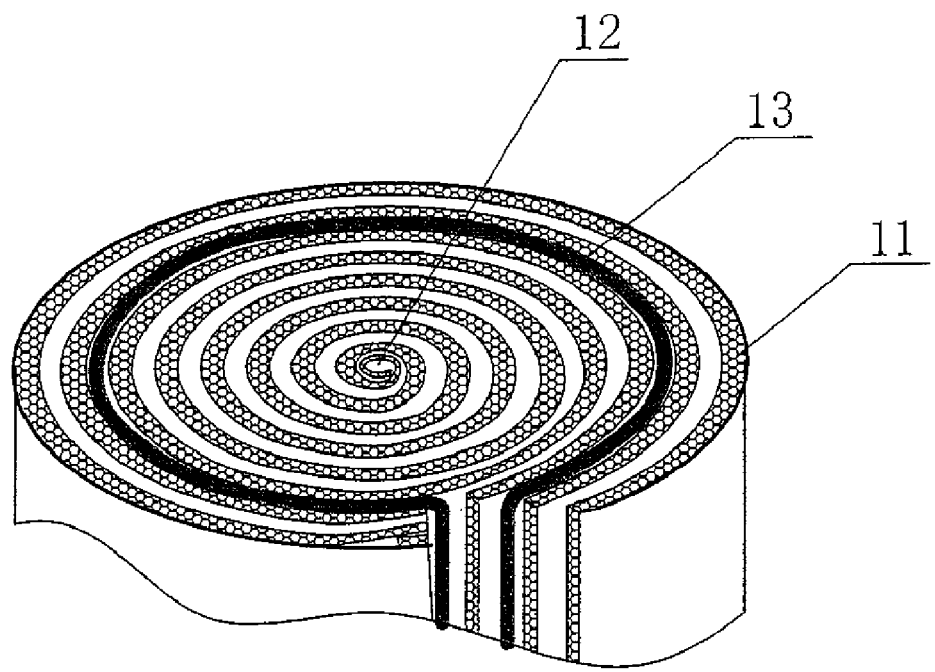
FIG. 6 is the overall structural representation of embodiment 3 of present invention.

FIG. 6 is the overall structural representation of embodiment 3 of present invention; As shown in FIG. 6, in the practical applications, according to different requirements for strength, the skeleton 13 may be a continuous skeleton or a discontinuous skeleton; At the same time, to achieve preferable effect in practical applications, the skeleton 13 may be inserted on one position or multiple positions. In this embodiment, the skeleton 13 is a continuous skeleton, which can just surround an interval of coiled explosion-proof material for a round.

Embodiment 4

Figure 7:
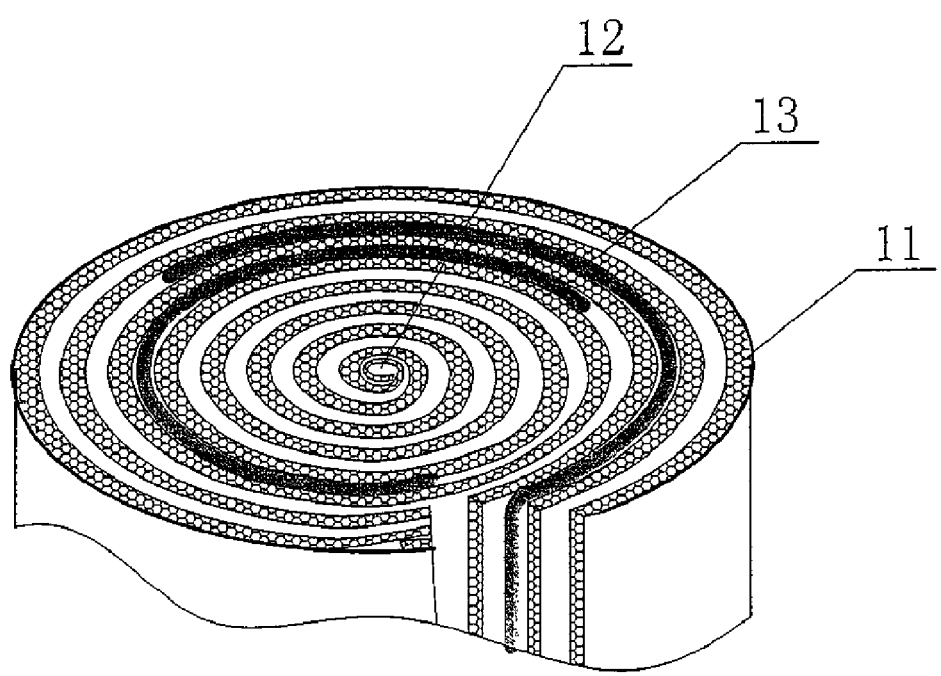
FIG. 7 is the overall structural representation of embodiment 4 of present invention.

As known from the procedures for inserting the skeleton 13 in this explosion-proof material of embodiment 1, the skeleton 13 is inserted in the process of upending and coiling the high-porosity sheet. Therefore, it is feasible to insert continuous skeletons varying in diameter and size in multiple positions in a cylindrical material to surround this circular cylinder for a round, and it is also feasible to insert discontinuous skeletons varying in diameter in multiple positions in the material body to surround partial circumference of the circular cylinder, so as to achieve preferable fixing and supporting effects. FIG. 7 is the overall structural representation of embodiment 4 of present invention. As shown in FIG. 7, in this embodiment, the skeletons 13 are discontinuous skeletons varying in diameter, which are inserted in multiple positions and surround partial circumference of the circular cylinder.

Embodiment 5

Figure 8:
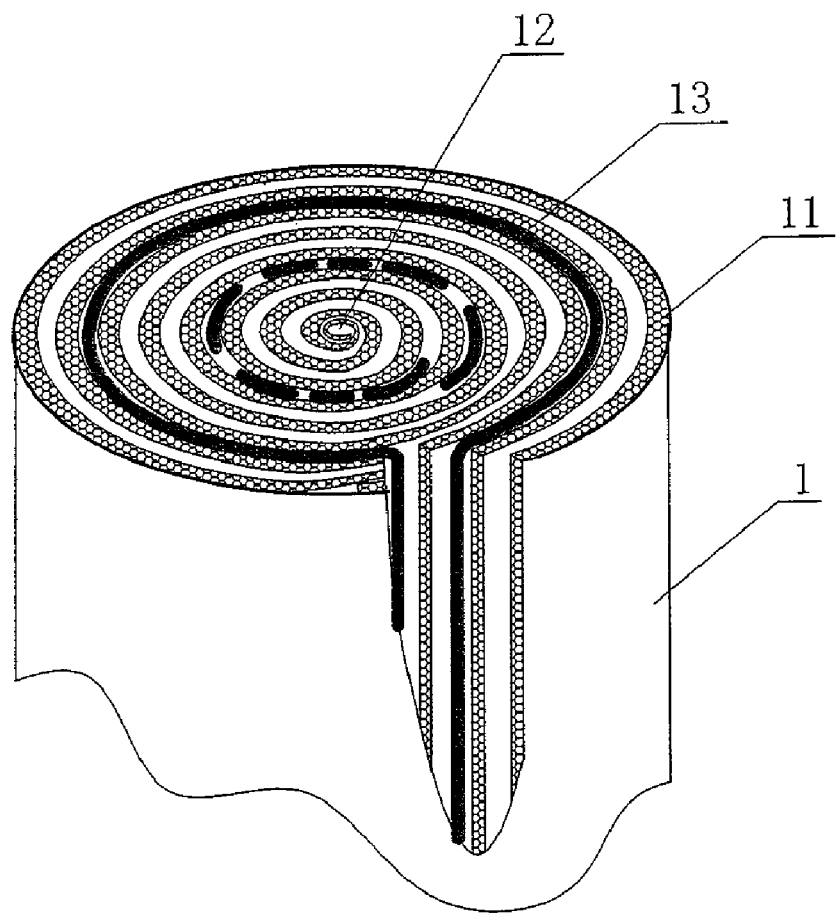
FIG. 8 is the overall structural representation of embodiment 5 of present invention.

FIG. 8 is the overall structural representation of embodiment 5 of present invention; With reference to embodiment 1 and 2, as shown in FIGS. 2-5 and FIG. 8, in this embodiment, the skeleton 13 with undulate carriage 131 in embodiment 1 is combined with the skeleton 13 with rectangle framework carriage 131 in embodiment 2. As shown in FIG. 8, in the position near the center of material body 1, inserting the skeleton 13 with undulate carriage 131; in the position near the edge of material body 1, inserting the skeleton 13 with rectangle framework carriage 131, this combined mode for inserting skeletons can guarantee the elasticity and rigidity of the material body 1 at the same time.

Embodiment 6

Figure 9:
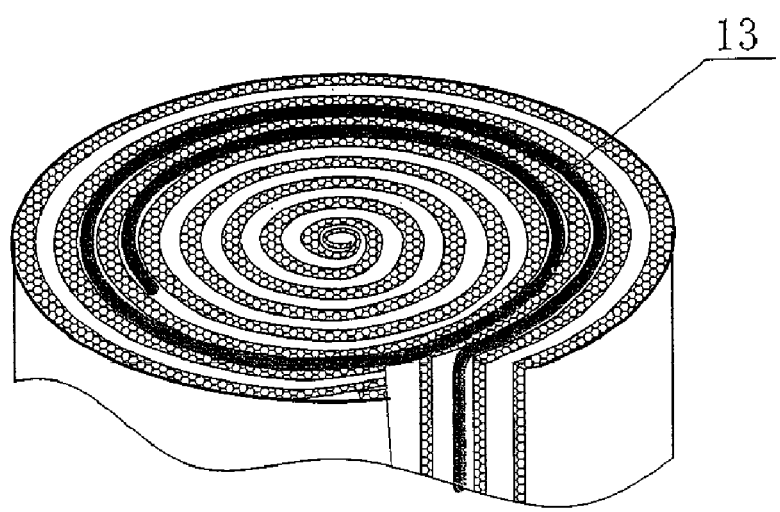
FIG. 9 is the overall structural representation of embodiment 6 of present invention.

FIG. 9 is the overall structural representation of embodiment 6 of present invention. As shown in FIG. 9, in this embodiment, the skeletons 13 are continuous and helical skeletons, which are inserted between multilayer high-porosity sheet 11 of the material body 1. The helical crimp degree of the skeletons 13 just adapt to the structure of multilayer high-porosity sheet 11. Before inserting the skeletons 13, it is also necessary to conduct pre-expansion on the skeletons 13. The inserted skeletons 13 will shrink to some extent, and their final shapes just correspond to the shape of the material body 1.

Embodiment 7

Figure 10:
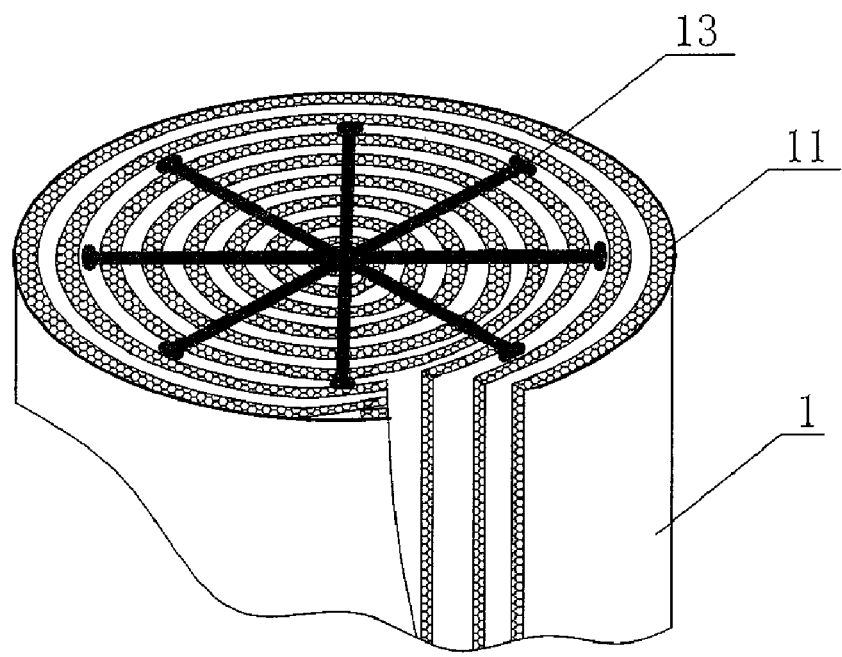
FIG. 10 is the overall structural representation of embodiment 7 of present invention.
Figure 11:
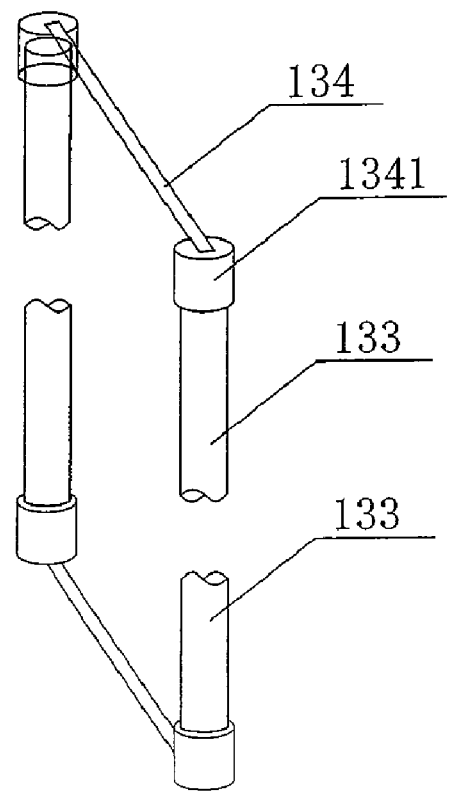
FIG. 11 is the structural representation of the skeleton connection of embodiment 7 of present invention.

FIG. 10 is the overall structural representation of embodiment 7 of present invention, and FIG. 11 is the structural representation of the skeleton connection of embodiment 7 of present invention; As shown in FIGS. 10 and 11, for the convenience in processing, the skeleton 13 may be also designed in the structure composed of columns 133 and beams 134. The columns 133 are inserted between multilayer high-porosity sheet 11 of the material body 1 and projected on the upper and lower end surfaces of the material body 1, and the beams 134 are connected with the projection parts of columns 133 on the upper and lower end surfaces of material body 1. In this embodiment, the procedures for inserting the skeleton 13 include: Firstly, during the process of winding said high-porosity sheet 11, the columns 133 are inserted in multiple positions between multilayer high-porosity sheet 11 of the material body 1 and projected on the upper and lower end surfaces of the material body 1; Then, using the beams 134 to connect the columns projected on the upper and lower end surfaces of the material body 1, thus the inserted skeleton 13 is formed properly.

Since the skeleton 13 is designed in this structure in this embodiment, the process procedure of conducting pre-expansion on the skeleton 13 in previous embodiment is avoided, and thus the pretreatment step in the processing procedure is simplified. Meanwhile, at the time of filling these explosion-proof units to other oil storage-transport devices, it is feasible to use the beams 134 connecting multiple units in the same manner. This simple structure is light in weight and low in cost.

Concretely, the multiple connection modes may also be adopted for the connection between the columns 133 and the beams 134. The connection mode as shown in FIG. 11 is merely a relatively simple and feasible mode among others. Attachment caps 1341 are provided on both ends of the beams 134. The connection and fixing between the column 133 and the beam 134 can be achieved by driving and fixing the attachment caps 1341 over the top ends of columns 133.

Embodiment 8

Figure 12:
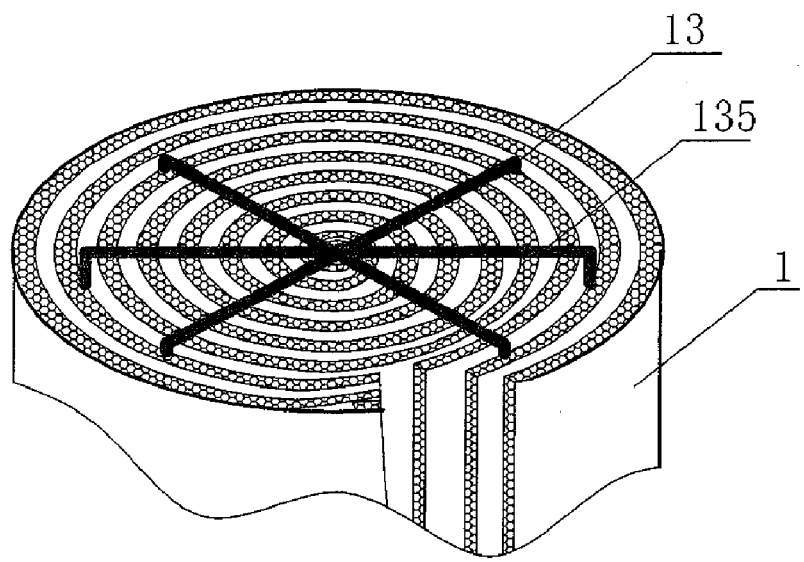
FIG. 12 is the overall structural representation of embodiment 8 of present invention.
Figure 13:
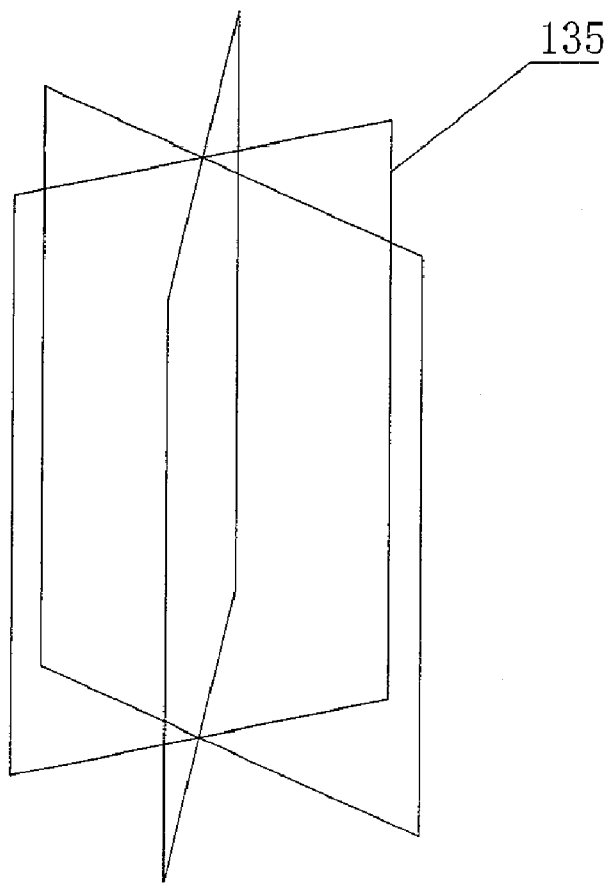
FIG. 13 is the structural representation of skeleton connection of embodiment 8 of present invention.

FIG. 12 is the overall structural representation of embodiment 8 of present invention, and FIG. 13 is the structural representation of skeleton connection of embodiment 8 of present invention. As shown in FIGS. 12 and 13, in this embodiment, the skeleton 13 is composed of more than one framework 135. These frameworks 135 are set up between multilayer high-porosity sheet 11 of the material body 1, and multiple frameworks 135 are mutually connected at their tops and bottoms, as shown in FIG. 13.

The procedures for inserting the skeleton 13 include: First, in the process of winding the high-porosity sheet 11, setting up multiple frameworks between the multilayer high-porosity sheet 11 of the material body, these frameworks can be separated with each other at certain angle interval. In general, said certain angle is 45°-90°. Then, connecting the multiple frameworks 135 at their tops and bottoms, thus the inserted skeleton 13 is formed properly.

This skeleton structure may also applicable to the explosion protection unit bodies filled in other oil storage-transport device and facilitate the connection between multiple unit bodies. Multiple unit bodies may be connected by mutually fixing the vertex angles of two adjacent frameworks 135 by means of fixing clamp. Also featured by simple structure and light in weight and low in cost, this framework structure is suitable for practical application.

Embodiment 9

Figure 14:
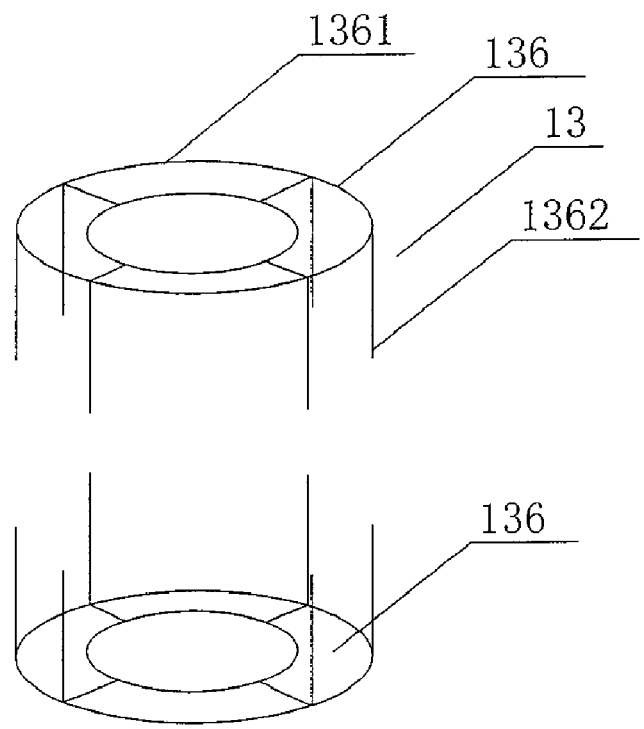
FIG. 14 is the structural representation of the skeleton of embodiment 9 of present invention.

FIG. 14 is the structural representation of the skeleton of embodiment 9 of present invention. As shown in FIG. 14, in this embodiment, the skeleton 13 is composed of two parts, upper and lower skeletons 136. These upper and lower skeletons 136 respectively include mutually connected end frames 1361 and insertion frames 1362. Said end frames 1361 are respectively put over the upper and lower end surfaces of the material body 1, and said insertion frames 1362 are inserted to the gap between multilayer high-porosity sheet 11 of the material body 1. In this embodiment, the procedures for inserting the skeleton 13 include: in the process of winding said high-porosity sheet 11, inserting the upper and lower skeletons 136 composed of mutually connected end frames 1361 and insertion frames 1362; said end frames 1361 are respectively put over the upper and lower end surfaces of material body 1, and said insertion frames 1362 are inserted to the gap between multilayer high-porosity sheet 11 of material body 1. In addition, when this structure form of skeleton 13 provided in this embodiment is adopted, it is not only possible to insert the skeleton in the process of winding the high-porosity sheet 11, but also possible to insert the skeleton 13 in an unified manner after completion of winding the flaky material with high void 11.

When this structure form of skeleton is adopted, the sum lengths of the insertion frames 1362 in the upper and lower skeletons 136 is just identical to the total height of the material body 1. For the purpose of saving material and reducing cost, the sum lengths of the insertion frames 1362 may also be less than the total height of material body 1. The lengths of insertion frames 1362 in each of upper and lower skeletons may be adjusted according to the actual requirement.

Embodiment 10

Figure 15:
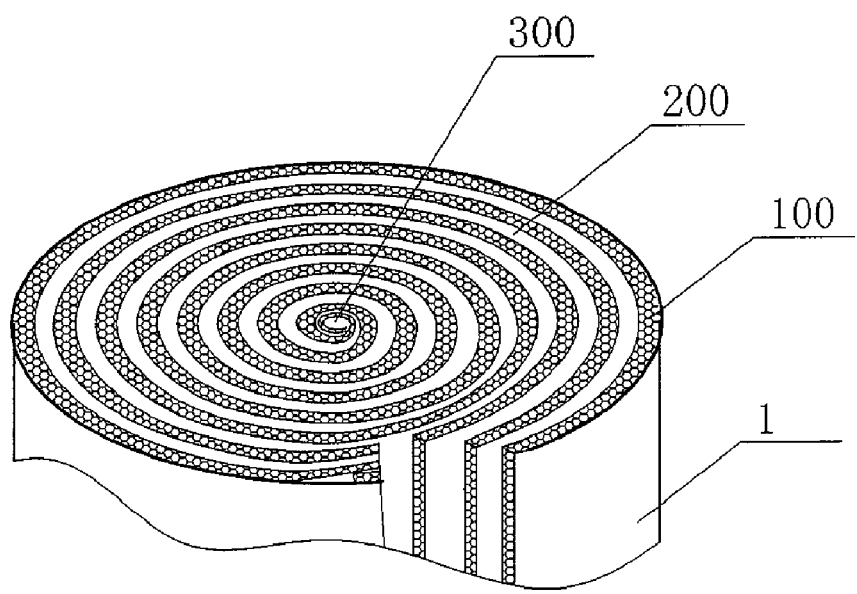
FIG. 15 is the structural representation of the end surface of embodiment 10 of present invention.

The above embodiments mainly provide the changes in the structure forms for the skeleton 13. The explosion-proof material provided by the present invention also has various combinations in terms of materials. FIG. 15 is the structural representation of the end surface of embodiment 10 of present invention. In this embodiment, the materials for the multilayer high-porosity sheet 11 are constituted by mixing non-metal material-metallic material-non-metal material. As shown in FIG. 15, this explosion-proof material is formed by the following procedures: through reticulation processing, a flexible isocyanurate foam material is made into the stereo honeycomb skeleton, which is used as the core-body 300; The reticular metallic material 200 expanded by the screen tension machine is enwinded on the core-body 300; Through enwinding and superimposing of multilayer reticular materials, a cylindrical semi-finished product is formed; Then, putting said material in the die for polyurethane material shape forming. carrying out the manufacturing process of polyurethane foam material, said semi-finished product is wrapped up and thus forming the coating layer 100. After shape forming, said semi-finished product becomes the explosion-proof material composed of non-metal material-reticular metal material-non-metal material. Both the non-metal material in internal core-body 300 and the non-metal material on outside coating layer 100 are the materials of polyurethane or polyether. The internal core-body 300 is a stereo honeycomb skeleton formed by flexible polyurethane foam material through reticulation processing, and the non-metal material on the outside coating layer 100 is packed by polyurethane foam material for shape forming. The reticular metallic material 200 between two non-metal materials is metal material or alloy material, such as aluminum alloy, titanium alloy and copper alloy etc. The aluminum alloy material may be prepared through traditional mechanical processing (For example, the screen tension machine mentioned before), and special alloy materials may be prepared through such processes as laser cutting, electron ray cutting and water-jet cutting etc. The different explosion-proof materials are used according to the different mediums and dangerous chemicals. As for this embodiment, the outside coating layer 100 is made from polyurethane material, the reticular metallic material 200 is aluminum alloy material and the core body 300 is made from polyurethane material. The adoption of such mixed materials brings about the following benefits: If the material body 1 is made from pure metal or alloy, when it is filled in a storage-transport vessel for containing liquid matters such as different kinds of oil products, the liquid matters in the vessel will generate swarming with the movement of this vessel. As a result, the explosion-proof material filled in the vessel will receive irregular stress and various parts of the explosion-proof material will also receive uneven stress. Long-term action of liquid swarming can easily result in the generation of scraps, which in turn affects the quality of the oil. When this mixed material is adopted in this embodiment, as the stable performance of polyurethane, it is unlikely to generate scraps. In addition, the composite structure with honeycomb void formed by its internal reticular metallic material and its outside non-metal material also generates the effect of technology-separate and explosion-proof.

Embodiment 11

Figure 16:
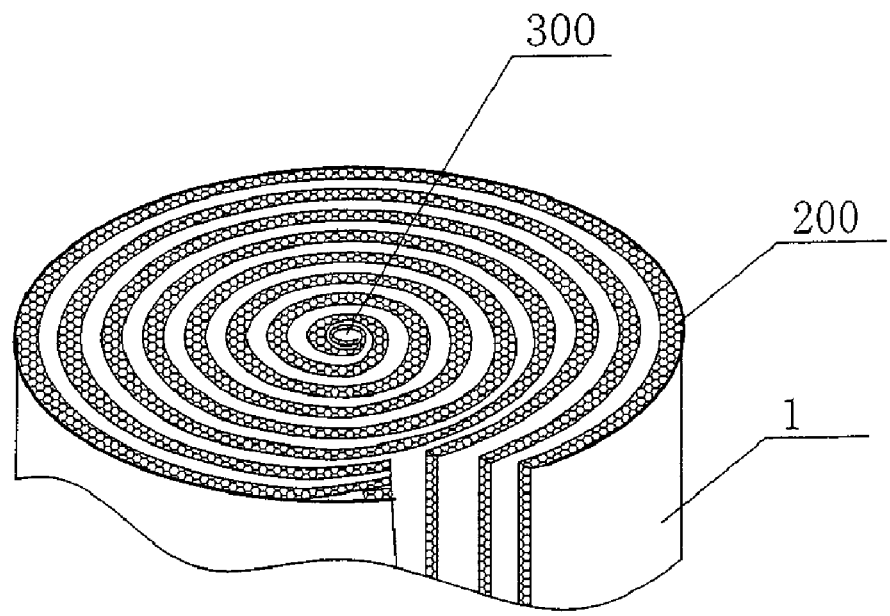
FIG. 16 is the structural representation of the end surface of embodiment 11 of present invention.

FIG. 16 is the structural representation of the end surface of embodiment 11 of present invention; As shown in FIG. 16, in this embodiment, this explosion-proof material is formed in the following procedures: through reticulation processing, the cylindrical skeleton, as the core-body 300, is formed from flexible polyurethane foam material. Then, the reticular metallic material 200 expanded by the screen tension machine is enwinded over the core-body 300. Through multilayer enwinding and superimposing, the cylindrical explosion-proof material is formed. This is a new type explosion-proof material composed of non-metal honeycomb material and reticular metallic material. The difference between this embodiment and embodiment 10 is that, the coil of material body 1 is merely composed of two parts, namely the outside reticular metallic material 200 and core-body 300. The core-body 300 is made from non-metal material, which is wrapped in the reticular metallic material 200. Since the processing procedures of this embodiment are identical to those of embodiment 10, unnecessary details will not be given herein. In this embodiment, the combination of metallic material and nonmetallic material are used as the materials for material body 1 in the same way. The wrapped outside reticular metallic material 200 can timely conduct out the static electricity and spark generated by the mutual friction and collision of core-body 300, thus achieve safety and reliability.

Embodiment 12

In this embodiment, the coil of material body 1 is merely composed of two parts, the outside part and the core part. However, in contrast with embodiment 11, the outside coil of this embodiment is made from non-metal material, and the core part coil is from metallic material.

The outside coil of this embodiment is made from non-metal material, so that the effect of preventing generation of metallic scraps as described in embodiment 10 is achieved. In addition, embodiment 11 and embodiment 12 also have the following advantages. As compared with the material body composed of metal material or alloy material, embodiment 11 and embodiment 12 may greatly reduce the production costs. In case of mutual collision of non-metal materials, spark and static electricity may easily occur due to friction. Therefore, in case of mixing use of non-metal material and metallic material, spark and static electricity may easily conducted out by metallic material even if they occur.

It is necessary to give additional remark that, for the explosion protection units provided by present invention, multiple combinations of metallic materials and non-metal materials may by adopted for its high-porosity sheet 11 and skeleton 13, such as non-metal skeleton inserted in metallic material, metallic skeleton inserted in metallic material, metallic skeleton inserted in non-metal material, non-metal skeleton inserted in non-metal material, metallic skeleton inserted in mixed material and non-metal skeleton inserted in mixed material etc. However, it is necessary to note that the adopted non-metal materials should be materials that may be easily foamed or expanded, such as polyether, poly-acid ester and polyurethane etc. In addition, such non-metal materials should be unlikely to produce static electricity and spark due to collision and friction. As for metallic materials, titanium alloy, copper alloy and iron alloy may be adopted.

Embodiment 13

Figure 17:
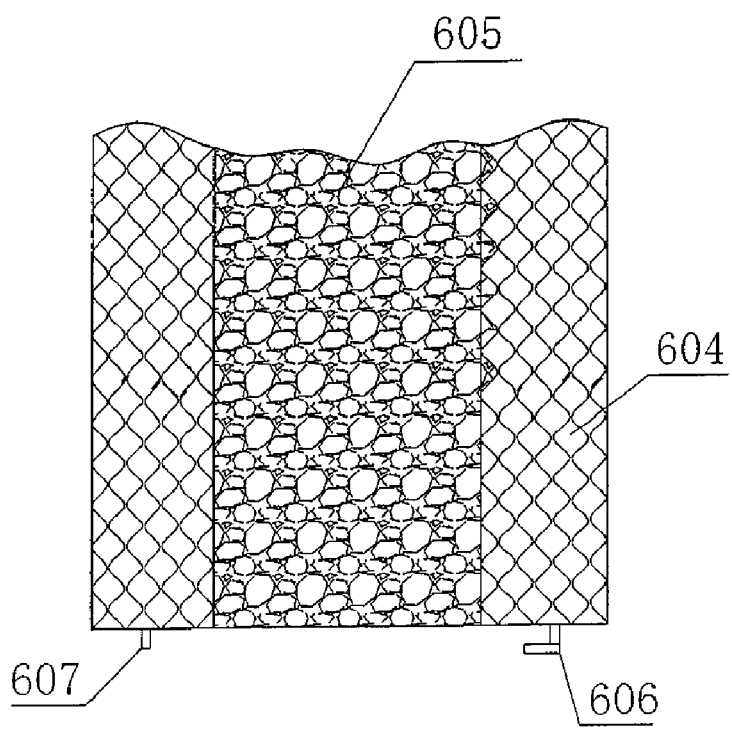
FIG. 17 is the overall structural representation of embodiment 13 of present invention.
Figure 18:
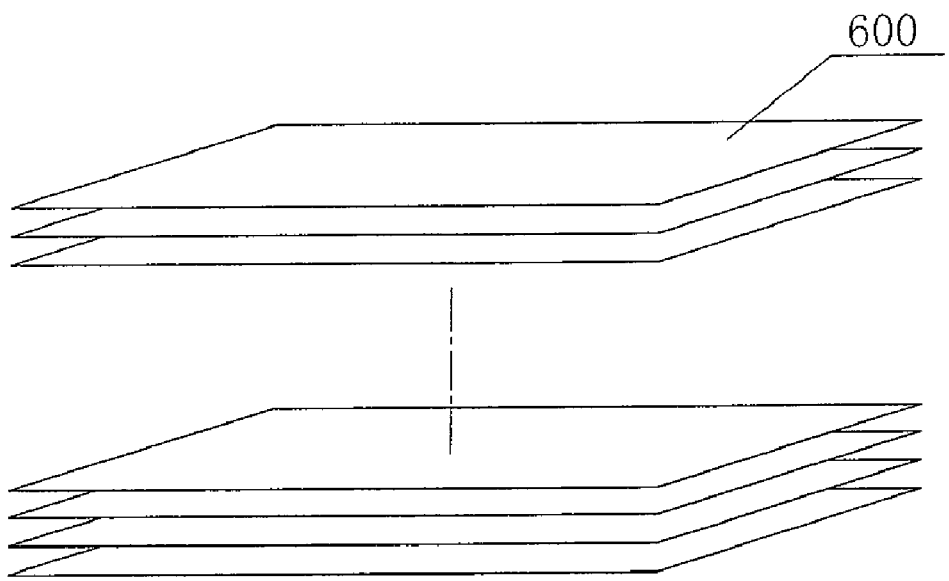
FIG. 18 is the schematic diagram of the bonding of original multilayer open-width foil material of embodiment 13 of present invention.
Figure 19:
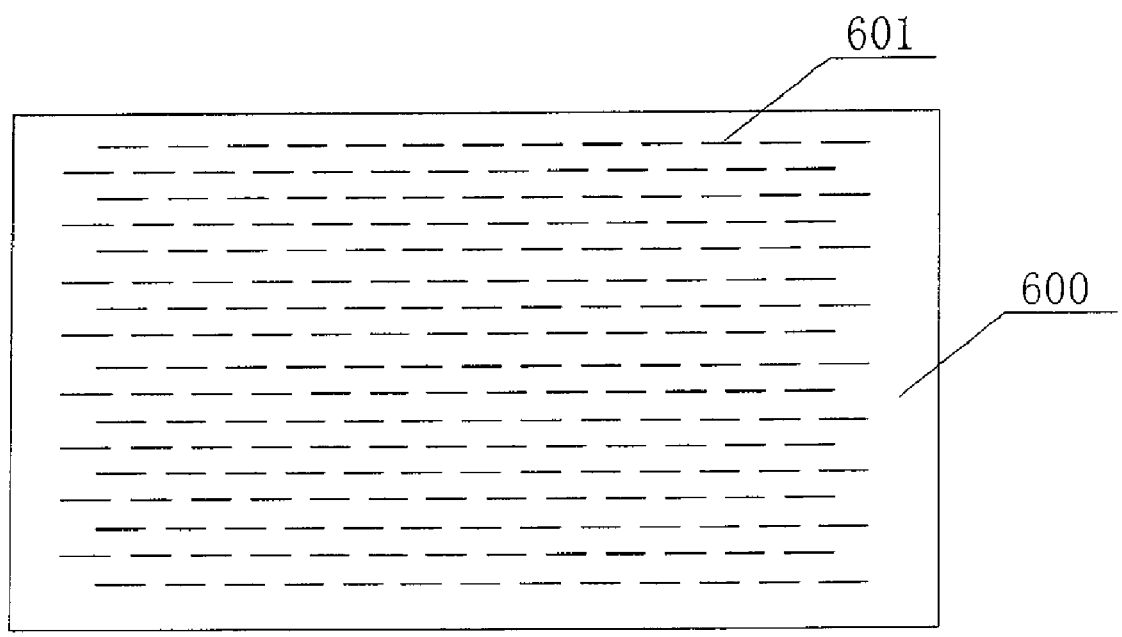
FIG. 19 is the schematic diagram of setting up bonding points on each piece of open-width original foil material of embodiment 13 of present invention.
Figure 20:
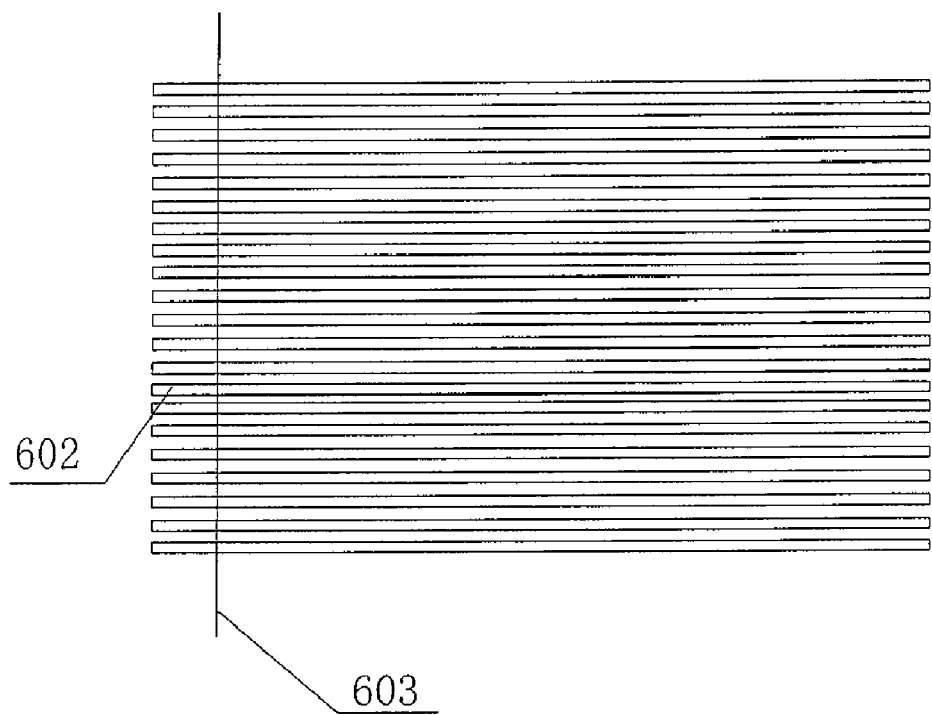
FIG. 20 is the structural representation and cutting position after bonding of original multilayer open-width foil material of embodiment 13 of present invention.
Figure 21:
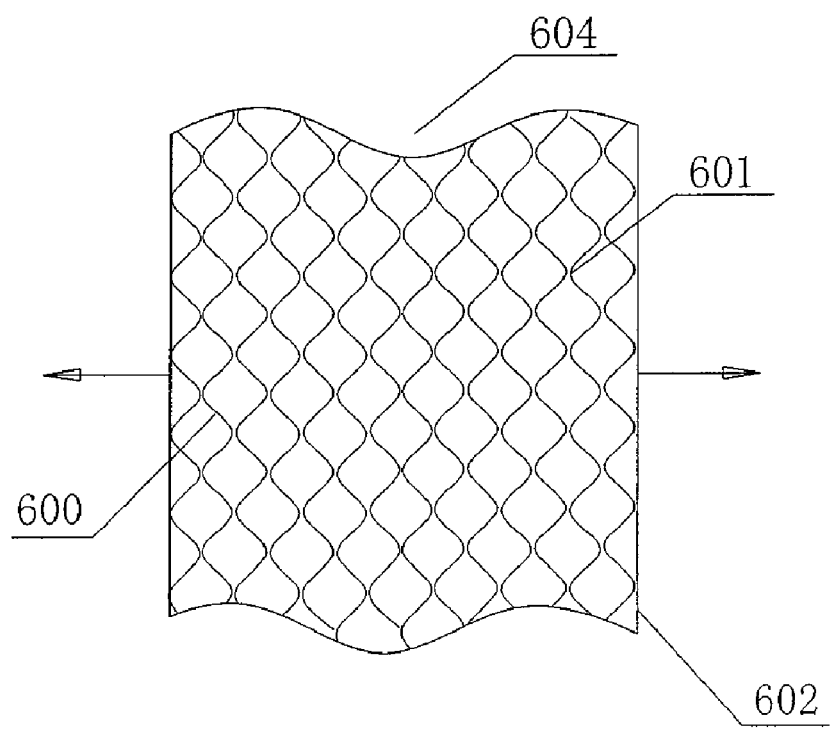
FIG. 21 is the structural representation of metal mesh of embodiment 13 of present invention.

FIG. 17 is the overall structural representation of embodiment 13 of present invention; As shown in FIG. 17, the explosion-proof material provided by this embodiment includes a core-body 605, and a metal mesh 604 provided on its outside. The core-body 605 is made from expandable foaming material. The processing method for the metal mesh 604 in this embodiment differs from that for the metal mesh expanded by screen tension machine in previous embodiment. The metal mesh 604 has stronger rigidity and may play the role of supporting. The specific processing method for this metal mesh 604 is shown in FIG. 18. FIG. 18 is the schematic diagram of the bonding of original multilayer open-width foil material of embodiment 13 of present invention; Concretely, the method is to mutually bond the upper and lower surfaces of two adjacent open width metallic original foil material 600 into multilayer in turn. FIG. 19 is the schematic diagram of setting up bonding points on each piece of open-width original foil material of embodiment 13 of present invention. As shown in FIG. 19, the bonding points 601 are set up at equal distance interval in the transverse and longitudinal directions; In addition, the bonding points on two adjacent lines on the same original foil material 600 are mutually staggered. FIG. 20 is the structural representation and cutting position after bonding of original multilayer open-width foil material of embodiment 13 of present invention. As shown in 20, the properly bonded multilayer open width metal original foil material is cut into strips 602 in the same direction 603. FIG. 21 is the structural representation of metal mesh of embodiment 13 of present invention. As shown in FIG. 21, the properly cut strips 602 is expanded along the direction being perpendicular to the cutting direction (the direction of arrow as shown in the Figure), so that the interval positions of each layer of original foil material 600 between the bonding points 601 are expanded into voids, and thus the flaky metal mesh with high void 604 is formed.

As shown in FIG. 17, for the explosion-proof material in this embodiment, the core-body 605 is made from expandable foaming material, which is compressible, and the metal mesh 604 is provided on its outside. The fabrication mode of the mesh determines that its strength is superior to the strength of the metal mesh expanded by the screen tension machine, so that the mesh can provide sound supporting effect. In addition, it is also feasible to correspondingly set up fixing devices 606 and 607 on the ends of metal mesh 604 on both sides of the nonmetallic core-body 605. During the process of transporting this material body, it is feasible to compress the core-body 605 by utilizing the compressible property of non-metal material and to fix the metal mesh 604 on both ends using the fixing devices 606 and 607. In this way, it is possible to save space and provide convenience for transportation. When this explosion-proof equipment has been delivered to the required place, opening the fixing devices 606 and 607, the nonmetallic core-body 605 will recover its original state, without affecting its installation, filling and use.

In the end, it must be mentioned as follows: the above embodiments are merely used to describe rather than limit the present invention. Although detailed description of present invention is provided with reference to the preferred embodiments, the common technical person of this field should understand that they could make modifications or equivalent substitutions on the present invention without going beyond the principle and scope of present invention. These modifications or equivalent substitutions should be included within the scope of claims of present invention.

The invention claimed is:

1. An explosion-proof material comprising a high-porosity sheet (11), said high-porosity sheet (11) being rolled up into a multilayer material body (1) with one side edge (12) of said high-porosity sheet (11) as an axis, and along a direction perpendicular to this side edge (12), characterized in that a skeleton(13) is inserted in the gaps between any two layers of the multilayer material body (1) to fix and support the material body (1), wherein said skeleton (13) is at least one of formed by interweaving a carriage (131) and a stiffening ring (132), the stiffening ring (132) being located in the middle of the carriage (131) and fixed on it, the shape of the skeleton(13) corresponding to the shape of material body (1);

composed of columns(133) and beam(134), said columns (133) are inserted between the high-porosity sheet (11) of the material body (1) and project on the upper and lower end surfaces of the material body(1), and the beam (134) is connected with the projection parts of columns (133) on the upper and lower end surfaces of material body (1);

composed of more than one framework(135), these frameworks(135) setting up between the multilayer high-porosity sheet (11) of the material body(1), and the multiple frameworks(135) connecting at their top and bottom; and composed of two parts, the upper skeleton and the lower skeleton(136), the upper and lower skeletons(136) respectively including mutually connected end frames (1361) and insertion frames(1362), said end frames (1361) respectively putting over the upper and lower end surfaces of the material body(1), and said insertion frames(1362) inserting in the gap between the multilayer high-porosity sheet (11) of the material body(1), for the purpose of fixing and supporting.

2. The explosion-proof material of claim 1, characterized in that said skeleton (13) is made from elastic material.

3. The explosion-proof material of claim 1, characterized in that said skeleton (13) is a continuous skeleton.

4. The explosion-proof material of claim 1, characterized in that said skeleton (13) is a discontinuous skeleton.

5. The explosion-proof material of claim 1, characterized in that said skeleton (13) is inserted in more than one position.

6. The explosion-proof material of claim 2 or 3 or 4 or 5, characterized in that said carriage (131) is undulated shape.

7. The explosion-proof material of claim 2 or 3 or 4 or 5, characterized in that said carriage (131) is a rectangle framework.

8. The explosion-proof material of claim 1, characterized in that said material body (1) may be in the shape of cuboid or cube or polygonal column.

9. The explosion-proof material of claim 1, characterized in that said high-porosity sheet (11) is made from one of metallic material, alloy material and materials obtained through metallic/non-metallic coating technology or their combination.

10. The explosion-proof material of claim 1, characterized in that said skeleton(13) is made from one of metallic material, non-metal material, alloy material and materials obtained through metallic/non-metallic coating technology or their combination.

11. A processing method for explosion-proof material, characterized in that the method includes the following steps:

Step 1: Through cutting, a grid form semi-finished material is formed from the original curly open-width foil material;

Step 2: Gradually expanding and stretching both sides of the grid form semi-finished material, a high-porosity sheet (11) is obtained;

Step 3: With one side(12) of this high-porosity sheet (11) as an axis, winding the material along the direction being perpendicular to this side;

Step 4: During the process of winding inserting the skeleton(13) into the gap between any two layers of the high-porosity sheet (11); winding the material continually until it forms a circular cylinder with required diameter; cutting off the high-porosity sheet (11), and thus forming the explosion-proof material, wherein Step 4 includes at least one of a first procedure of Step 4.1: conducting pre-opening treatment on the skeleton (13) formed by interweaving the undulated carriage(131) and a stiffening ring(132) or rectangular carriage(131) and stiffening ring(132), said stiffening ring (132) being located in the middle of the carriage (131) and fixed on it, the shape of the skeleton (13) corresponding to the shape of the wound circular cylinder;

Step 4.2: inserting the pre-opened skeleton(13) into the high-porosity sheet (11), this skeleton(13) is inserted into one position or multiple positions in a continuous or spiral or discontinuous manner, wherein Step 4.2 includes a procedure of inserting the skeleton(13) formed by interweaving the undulated carriage(131) and stiffening ring(132) in multiple positions, or inserting the skeleton(13) formed by interweaving the rectangular carriage(131) and stiffening ring(132) in multiple positions, or inserting said two kinds of skeletons(13) in multiple positions in combined manner;

a second procedure of
- Step 4.1': in the process of winding said high-porosity sheet (11), string columns(133) on multiple positions between multilayer high-porosity sheet (11) of material body, so that the columns project on the upper and lower end surfaces of material body (1);
- Step 4.2': connecting the parts of columns projecting on the upper and lower end surfaces of material body(1) with a beam(134), so as to form the properly inserted skeleton(13);

a third procedure of
- Step 4.1": in the process of winding said high-porosity sheet (11), setting up multiple frameworks(135) between the multilayer high-porosity sheet (11) of the material body, with these frameworks being separated with each other at certain angle interval;
- Step 4.2":connecting multiple frameworks(135)with each other at their top and bottom, so as to form properly inserted skeleton(13); and a fourth procedure of
- Step 4.1'": in the process of winding said high-porosity sheet(11), inserting the upper and lower skeleton (136) composed of mutually connected end frames (1361) and insertion frames(1362), said end frames (1361) being respectively put over the upper and lower end surfaces of the material body(1), and said insertion frames (1362) being inserted in the gap between multilayer high-porosity sheet (11) of the material body(1), for the purpose of fixing and supporting.

12. A processing method for explosion-proof material, characterized in that this method includes the following steps:
- Step 1: Through cutting, a grid form semi-finished material is formed from the curly open-width original foil material;
- Step 2: Gradually expanding and stretching outward both sides of the grid form semi-finished material, so as to obtain a high-porosity sheet (11);
- Step 3: With one side(12) of this high-porosity sheet (11) as the center, winding the material along the direction perpendicular to this side;
- Step 4: After winding to the specified extent, cutting off the high-porosity sheet (11), inserting the skeleton(13) in the gap between the rolled circular cylinder material layers, so as to form multilayer explosion-proof material, wherein Step 4 includes at least one of a first procedure of
- Step 4.1: conducting pre-opening treatment on the skeleton (13) formed by interweaving the undulated carriage(131) and a stiffening ring(132) or rectangular carriage(131) and stiffening ring(132), said stiffening ring (132) being located in the middle of the carriage (131) and fixed on it, the shape of the skeleton (13) corresponding to the shape of the wound circular cylinder;
- Step 4.2: inserting the pre-opened skeleton(13) into the high-porosity sheet (11), this skeleton(13) is inserted into one position or multiple positions in a continuous or spiral or discontinuous manner, wherein Step 4.2 includes a procedure of
  - inserting the skeleton(13) formed by interweaving the undulated carriage(131) and stiffening ring(132) in multiple positions, or
  - inserting the skeleton(13) formed by interweaving the rectangular carriage(131) and stiffening ring(132) in multiple positions, or
  - inserting said two kinds of skeletons(13) in multiple positions in combined manner;

a second procedure of
- Step 4.1': in the process of winding said high-porosity sheet (11), string columns(133) on multiple positions between multilayer high-porosity sheet (11) of material body, so that the columns project on the upper and lower end surfaces of material body (1);
- Step 4.2': connecting the parts of columns projecting on the upper and lower end surfaces of material body(1) with a beam(134), so as to form the properly inserted skeleton(13);

a third procedure of
- Step 4.1": in the process of winding said high-porosity sheet (11), setting up multiple frameworks(135) between the multilayer high-porosity sheet (11) of the material body, with these frameworks being separated with each other at certain angle interval;
- Step 4.2": connecting multiple frameworks(135)with each other at their top and bottom, so as to form properly inserted skeleton(13); and a fourth procedure of
Step 4.1'": in the process of winding said high-porosity sheet(11), inserting the upper and lower skeleton(136) composed of mutually connected end frames(1361) and insertion frames(1362), said end frames(1361) being respectively put over the upper and lower end surfaces of the material body(1), and said insertion frames (1362) being inserted in the gap between multilayer high-porosity sheet (11) of the material body(1), for the purpose of fixing and supporting.

* * * * *